United States Patent Office 3,297,681
Patented Jan. 10, 1967

3,297,681
CRYSTALLIZATION OF FINE HMX
Sam B. Wright and Albert Donald Evans, Kingsport, Tenn., assignors to Eastman Kodak Company, Rochester, N.Y., a corporation of New Jersey
No Drawing. Filed Feb. 26, 1964, Ser. No. 347,376
4 Claims. (Cl. 260—239)

This invention relates to the manufacture of HMX and more particularly to the crystallization of HMX in the beta polymorphic form, more than half of the prismatic crystals or particles of which are less than USSS No. 325 in size.

HMX is an explosive also known as 1,3,5,7-tetranitro-1,3,5,7-tetrazacyclooctane or cyclotetramethylenetetranitramine. In the manufacture of HMX it is desirable to obtain a product in the form of fine beta polymorphic crystals. The need for such a process is disclosed by our coworkers Lee and Sims in U.S. Patent 3,069,477, issued December 18, 1962, in which a process is described for converting coarse beta polymorphic HMX to fine β-HMX crystals or particles, at least a part of which are less than USSS No. 325 in size, by re-circulating a suitably diluted HMX/water slurry by passage through pumps and throttling valves.

This method of manufacturing fine HMX, although yielding a desirable particle size and the beta polymorph, requires the use of coarse recrystallized β-HMX, sufficient water (about 8 parts of water to 1 part HMX) to provide efficient processing of the HMX through the grinding pumps, and subsequent processing through cyclone separators to yield fine HMX. The resulting product may sometimes be somewhat difficult to filter and require rather lengthy filtration cycles to yield a product with the desired moisture content. Also the final product may sometimes be quite viscous. It is therefore apparent that the development of a simplified process for obtaining β-polymorphic fine crystalline HMX represents a highly desirable result.

One object of this invention is to provide a process for the preparation of fine β-HMX by crystallization from solution. Another object is to provide a process whereby crude α-HMX is used to produce fine β-HMX. Still another object is to provide a process for producing β-HMX with particle size characteristics such that a major portion is less than USSS No. 325. A further object is to provide a process for obtaining fine β-HMX crystals or particles with distinct shapes such that improved filtration and handling of the product is obtained. Other objects will appear hereinafter.

The foregoing objects, as well as others which will become apparent from the following description, are accomplished by crystallization of β-HMX from solution by a new seeding and precipitation technique. The procedure consists of dissolving crude α-HMX in a suitable solvent, such as acetone, acetonitrile, dimethylsulfoxide, or the like, at 50 to 100° C., depending on the solvent used. The solution of HMX is cooled to 20 to 35° C., preferably about 25° C. Fine β-HMX with a particular surface area (about 8,000 to 13,000 cm.² per gram, as determined by the Fisher Sub-Sieve Sizer) is added to the solution as seed material. A diluent (substantially nonsolvent for HMX, for example, water) is added rapidly to the solution to precipitate the HMX from solution. The mixture is then heated to remove the solvent from the system. After cooling to about 30 to 40° C., the HMX is vacuum filtered to a filter cake moisture content of 15 to 25%.

Producing fine crystalline material by rapid quenching or shocking of the material from solution with a suitable diluent is known. However, in the case of HMX, the use of known techniques sometimes yields fine HMX crystals with the less desirable alpha or gamma polymorphs. The beta polymorph is preferred because of its lower sensitivity. We have found quite unexpectedly that the use of a particular particle size β-HMX with a surface area of about 8,000 to 13,000 cm.² per gram (as determined by the Fisher Sub-Sieve Sizer) as seed material yields beta polymorphic HMX with particle size characteristics such that a major portion is less than USSS No. 325. The particle size distribution of HMX, particularly the percentage passing the USSS No. 325, may be controlled somewhat by the amount of seed material. We prefer to use 1 to 10 percent by weight of seed material based upon the HMX solute.

The HMX to be crystallized according to our invention may be the alpha or beta polymorphic form of HMX. The use of α-HMX eliminates the necessity of recrystallizing HMX, as obtained from the nitration of hexamine, to obtain the beta polymorphic form.

Any organic liquid with good solubility properties for HMX may be used as solvent, for example, acetone, acetonitrile, dimethyl formamide, dimethyl sulfoxide, cyclohexanone, or the like. The diluent (substantially nonsolvent for HMX) may be selected from such compounds as water, ethanol, methanol, toluene, benzene, heptane, and the like, with water being preferred.

Some applications for fine HMX dictate that very little, if any, water be associated with the explosive product. The process of our invention is readily adaptable to such a requirement by using as diluent an organic liquid which will not dissolve HMX, for example, ethanol or heptane. In addition to being controlled by the seed material used, the particle size distribution may be further controlled according to our invention by regulating the amount of diluent added to the explosive solution, the temperature of the HMX solution at the time of precipitation, the temperature of the diluent, agitation speed, and distillation time.

The following examples are illustrative of our invention.

Example I

Prepare an acetone solution of HMX by dissolving 500 pounds α-HMX in 13,820 lbs. of aqueous acetone (86% acetone) under agitation at about 55° C. Cool the solution to 25° C. and add 25 lbs. of β-HMX seed (98% passing USSS No. 325, surface area of about 13,000 square centimeters per gram). Add 13,350 lbs. water at ambient temperature (20 to 30° C.) to the mixture. Heat the mixture to remove acetone from the system. Hold at the maximum temperature of 99+° C. for 15 minutes. Cool the batch to 30 to 40° C. and drop to a nutsche filter. Vacuum filter the material for 1 to 2 hours. The product exhibited the following properties:

Percent HMX—99.3, melting point—280° C.
Acetone insolubles—none
Crystal acidity (percent as acetic acid)—0.02
Impact sensitivity, centimeters—28.4
Polymorph—beta
Percent passing USSS No. 325—94.3%
Median diameter (Buckbee-Mears Screening Method)—21 microns
Average diameter (Fisher Sub-Sieve Sizer)—10 microns, surface area, square centimeters per gram (Fisher Sub-Sieve Sizer)—3,158

Example II

Dissolve 600 lbs. of HMX recrystallized from acetone (beta polymorph) in 16,290 lbs. of aqueous acetone (88% acetone). Cool the solution to 25° C. and add 25 lbs. of seed HMX, as described in Example I. Add about 14,000 lbs. water to the batch and process as in Example I. The product exhibited the folowing characteristics:

HMX percent—98.8, melting point, ° C.—278
Acetone insoluble—none
Crystal acidity, percent as acetic acid—none
Impact sensitivity, centimeters—28.2
Polymorph—beta
Percentage passing USSS No. 325—94.8
Median diameter (Buckbee-Mears Screening Method)—28 microns
Average diameter—Fisher Sub-Sieve Sizer—13 microns
Surface area, square centimeters per gram (FSSS)—1,615

*Example III*

Dissolve 120 g. of water-wet beta HMX (80% HMX, dry basis), HMX being recrystallized from acetone, in 2600 g. of aqueous acetone (96% acetone). Cool the solution to 20 to 30° C. Add 5 g. seed HMX (surface area about 13,000 cm.$^2$/g.) Add 2700 g. heptane/acetone solution, ambient temperature (80% heptane). Heat the mixture to 99+° C. to remove acetone, water and roughly 80% of the heptane charge from the system. Drop the product containing about 100 grams of β-HMX, and 465 g. heptane from the still and filter. The distillate is treated to recover acetone and heptane for reuse. The HMX product from this process exhibited the following characteristics:

HMX percent—99+
Polymorph—beta
Crystal acidity—none
Percent water—0.02
Heptane percent—about 50
Percent passing USSS No. 325—95
Median diameter, microns (Buckbee-Mears Method)—18

From the foregoing description and examples it should be apparent that we have provided a simplified method of producing fine β-HMX wet with water or heptane whereby seeding permits substantially complete crystallization and collection in one short heating-cooling-distillation cycle.

Although our invention has been described in considerable detail with particular reference to certain preferred embodiments thereof, variations and modifications can be effected within the spirit and scope of the invention as described hereinabove and as defined in the appended claims.

We claim:

1. A process for preparation of β-HMX which comprises preparing a solution of crude HMX, cooling the solution to 20 to 35° C., seeding the solution with fine β-HMX of a surface area of about 8,000 to 13,000 cm.$^2$ per gram, precipitating HMX from the solution in beta-polymorphic form by rapidly adding to the solution a diluent which is substantially non-solvent for HMX, heating the mixture sufficiently to volatilize the solvent medium, cooling to about 30 to 40° C., filtering, and collecting β-HMX crystals the majority of which are of a size such that they pass USSS Sieve No. 325, said crystals having a moisture content of less than about 25%.

2. The process according to claim 1 wherein the temperature to which the solution is cooled is about 25° C., the solution of crude HMX comprises α-HMX, the amount of fine β-HMX used in seeding is about 1 to 10% by weight of the HMX solute, the temperature to which the mixture is heated to volatilize the solvent medium is at least about 99° C., the solvent medium is selected from the group consisting of acetone, acetonitrile, cyclohexanone, dimethyl formamide, and dimethyl sulfoxide and the diluent is selected from the group consisting of water, ethanol, methanol, toluene, benzene and heptane.

3. In a process for preparation of fine β-HMX from crude HMX by rapid quenching and precipitation from dispersion with a diluent, the improvement which comprises seeding a dispersion of a material selected from the group consisting of α-HMX and β-HMX with β-HMX having a surface area of about 8,000 to 13,000 cm.$^2$ per gram, thereby bringing about collection of β-HMX crystals a major proportion of which pass a USSS Sieve No. 325 upon subsequent addition of precipitating diluent, volatilizing of dispersion medium, cooling and filtering.

4. A process for preparation of fine β-HMX which comprises preparing at about 50–60° C. a solution of HMX prepared by nitration of hexamine in aqueous acetone, the amount of HMX amounting to about 3 to 5 percent by weight of the acetone, cooling the solution to about 20–30° C., adding about 1 to 10% by weight of the HMX solute of fine β-HMX seed, adding at ambient temperature an amount of water at least about equal to the amount of acetone thereby precipitating the HMX from the solution, heating the resulting mixture to a maximum temperature of at least about 99° C. and holding at said temperature for about 5–30 minutes thereby removing substantially all of the acetone from the mixture, cooling the mixture to 30 to 40° C. and dropping to a filter and filtering for about 1 to 2 hours until collecting β-polymorphic HMX in crystals the majority of which pass a USSS Sieve No. 325.

No references cited.

ALEX MAZEL, *Primary Examiner.*

A. D. ROLLINS, *Assistant Examiner.*